United States Patent
Hiroe et al.

(10) Patent No.: US 7,595,761 B2
(45) Date of Patent: Sep. 29, 2009

(54) VEHICULAR DOOR MIRROR DEVICE

(75) Inventors: Terukazu Hiroe, Aichi-ken (JP); Nana Nakajima, Aichi-ken (JP); Hiroaki Kojima, Aichi-ken (JP); Satoshi Ito, Aichi-ken (JP); Nobuhiro Ide, Toyota (JP)

(73) Assignees: Kabushiki Kaisha Tokai-Rika-Denki-Seisakusho, Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 602 days.

(21) Appl. No.: 11/385,819

(22) Filed: Mar. 22, 2006

(65) Prior Publication Data
US 2006/0214862 A1  Sep. 28, 2006

(30) Foreign Application Priority Data
Mar. 24, 2005 (JP) ............................. 2005-086880
Mar. 24, 2005 (JP) ............................. 2005-086881

(51) Int. Cl.
*H01Q 1/32* (2006.01)
(52) U.S. Cl. ...................................... 343/713; 343/711
(58) Field of Classification Search ................. 343/711, 343/713
See application file for complete search history.

(56) References Cited

U.S. PATENT DOCUMENTS

| 6,078,294 | A | 6/2000 | Mitarai |
| 7,265,725 | B2 * | 9/2007 | Nakajima et al. ............ 343/713 |
| 2003/0085772 | A1 * | 5/2003 | Lin et al. ..................... 333/116 |
| 2003/0162524 | A1 | 8/2003 | Schultze |
| 2006/0022881 | A1 * | 2/2006 | Yegin et al. .................. 343/713 |
| 2008/0001834 | A1 * | 1/2008 | Yegin et al. .................. 343/713 |

FOREIGN PATENT DOCUMENTS

| DE | 196 30 070 A1 | 1/1998 |
| JP | 2004-130875 | 4/2004 |
| JP | 2004-168153 | 6/2004 |
| JP | 2004-168153 A | 6/2004 |

* cited by examiner

*Primary Examiner*—Trinh V Dinh
(74) *Attorney, Agent, or Firm*—Roberts Mlotkowski Safran & Cole, P.C.; Thomas W. Cole (57) ABSTRACT

A door mirror device includes an antenna and a metal frame for attaching parts. The antenna is capable of at least one of receiving radio transmissions from the outside of a vehicle cabin or transmitting radio transmissions to the outside of the vehicle cabin. The antenna includes a plate and a case that are electrically continuous with a matching-use base plate. The plate and the case of the antenna are fixed to the frame by a tapping screw. The antenna is grounded to the frame as a result of the plate becoming electrically continuous with the frame via the tapping screw.

15 Claims, 12 Drawing Sheets

← REARWARD OF VEHICLE    FRONTWARD OF VEHICLE →

VEHICULAR DOOR MIRROR DEVICE

CROSS-REFERENCE TO RELATED APPLICATION

This application claims priority under 35 USC 119 from Japanese Patent Applications Nos. 2005-086880 and 2005-086881, the disclosures of which are incorporated by reference herein.

BACKGROUND OF THE INVENTION

1. Field of the Invention

The present invention relates to a vehicular door mirror device.

2. Description of the Related Art

There are vehicles such as automobiles disposed with, for example, tire pressure monitoring systems (TPMS) that monitor the air pressure of the tires, remote keyless entry (RKE) systems for remotely unlocking and locking the doors, and/or television (TV) receivers. These types of tire pressure monitoring systems, remote keyless entry systems and TV receivers are actuated when they receive radio transmissions from the outside of the vehicle cabin.

Here, as receiving devices for receiving such radio transmissions, there are receiving devices that include an antenna attached to the inside of a door mirror device (the inside of a door mirror enclosure) (e.g., see Japanese Patent Application Publications Nos. 2004-130875 and 2004-168153). A dedicated base plate disposed inside the door mirror enclosure, for example, is electrically connected to the antenna and serves as the ground of the antenna.

However, when trying to obtain a sufficient ground with a dedicated base plate (when trying to sufficiently ground the antenna to a dedicated base plate), it is necessary to enlarge the area (size) of the dedicated base plate. For this reason, there has been the problem that the dedicated base plate must be large and is difficult to make compact.

There are also configurations which obtain the ground from the vehicle body, without obtaining the ground from a dedicated base plate, by connecting an electrical cable (e.g., an AV cable) to the antenna and disposing the electrical cable inside the vehicle body.

However, because the electrical cable must be disposed inside the vehicle body, the work of disposing the electrical cable is complicated. Also, after this work of disposing the electrical cable, the disposed position of the electrical cable ends up being changed merely when the door mirror switches between its accommodated state and its erect state because the electrical cable is disposed inside the vehicle body. For this reason, there has been the problem that the antenna characteristics end up fluctuating.

SUMMARY OF THE INVENTION

In view of these problems, the present invention provides a vehicular door mirror device that is compact and can suppress fluctuations in the antenna characteristics.

A vehicular door mirror device pertaining to a first aspect of the invention comprises: an antenna that is disposed inside a mirror enclosure disposed such that the mirror enclosure protrudes outward from a door of a vehicle, with the antenna being capable of at least one of receiving radio transmissions from the outside of a vehicle cabin or transmitting radio transmissions to the outside of the vehicle cabin; and a metal frame for attaching parts disposed inside the mirror enclosure, supporting the antenna with a fixing member, and serving as the ground of the antenna.

A vehicular door mirror device pertaining to a second aspect of the invention comprises: an antenna that includes a case that is electrically insulated and houses a matching-use base plate that adjusts at least one of the receiving efficiency or the transmitting efficiency of radio transmissions and a metal plate that is electrically continuous with the matching-use base plate and is exposed to the outside of the case, with the antenna being disposed inside a mirror enclosure that is disposed such that the mirror enclosure protrudes outward from a door of a vehicle and being capable of at least one of receiving radio transmissions from the outside of a vehicle cabin or transmitting radio transmissions to the outside of the vehicle cabin; a metal frame for attaching parts that is disposed inside the mirror enclosure and is electrically insulated as a result of an antirust treatment being administered to its surface; and a fixing member that fixes the antenna to the frame as a result of the fixing member being inserted into the plate and the case and is electrically continuous with the antenna and the frame, with the frame serving as the ground of the antenna.

BRIEF DESCRIPTION OF THE DRAWINGS

An embodiment of the present invention will be described below with reference to the accompanying drawings, wherein.

DETAILED DESCRIPTION OF THE INVENTION

A door mirror device 10 pertaining to an embodiment of the invention will now be described on the basis of FIGS. 1 to 12.

The door mirror device 10 is disposed such that it protrudes outward from the doors of a vehicle, and is attached to the door on the right side and the door on the left side of the vehicle. For convenience of description, an example will be described here where the door mirror device 10 is attached to the door on the right side of the vehicle.

Figure 1:
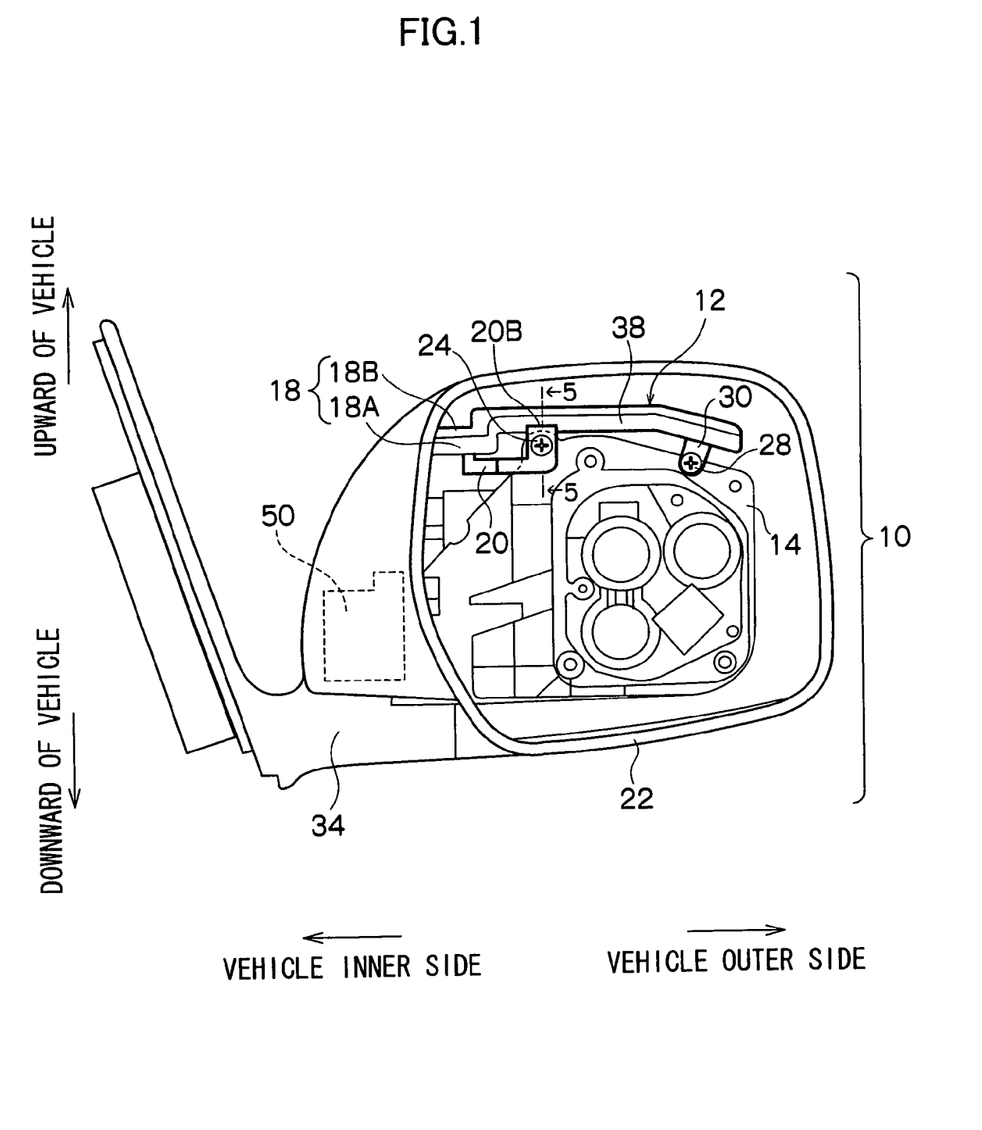
FIG. 1 is a front sectional view schematically showing a vehicular door mirror device pertaining to the embodiment of the invention.

In FIG. 1, the relevant portions of the invention when the door mirror device 10 is seen from rearward of the vehicle are schematically shown in a front sectional view. The door mirror device 10 includes a door mirror stay 34 that is fixed to the door of the vehicle. A stand 50 is supported on the door mirror stay 34 such that the axial direction of the stand 50 is in the vertical direction of the vehicle, and the stand 50 is configured to be pivotable about its axis.

A mirror enclosure 22 is attached to the stand 50, and the stand 50 is covered by the mirror enclosure 22. The mirror enclosure 22 is configured to be pivoted together with the stand 50 such that the mirror enclosure 22 becomes accommodated or erect. The mirror enclosure 22 is formed in a substantially rectangular box-like shape, for example, with one side thereof being open.

A frame 14 for attaching parts is disposed inside the mirror enclosure 22. The frame 14 is fixed to the stand 50 with unillustrated fixing screws such that the frame 14 is erectly disposed inside the mirror enclosure 22. The frame 14 is made of metal and is shaped such that it is concave in the forward direction and rearward direction of the vehicle by drawing a frame formation-use metal plate (e.g., a steel plate) that has been press-formed. The frame 14 may also be a metal body formed by casting.

Plating (an antirust treatment) is administered to the entire surface of the frame 14, and the frame 14 is electrically insulated as a result of the surface treatment film 15 that is formed by this plating. An unillustrated mirror angle adjusting device that swingably retains an unillustrated rearview mirror for verifying the rearward of the vehicle is attached to the rear side of the frame 14. A substantially circular cylinder-like tapping screw receiving portion 14A that protrudes rearward is disposed on the vehicle inner side and vehicle upper side of the frame 14 (see FIGS. 5A and 5B).

At the upper portion of the frame 14, an unillustrated screw receiving portion is disposed at a position further outward than the tapping screw receiving portion 14A. The unillustrated screw receiving portion is formed in a substantially circular cylinder-like shape and protrudes rearward in the same manner as the tapping screw receiving portion 14A.

An antenna 12 is disposed above the frame 14. The antenna 12 is disposed inside the mirror enclosure 22 together with the frame 14. The antenna 12 is configured to be capable of at least one of receiving radio transmissions from the outside of the vehicle cabin and transmitting radio transmissions to the outside of the vehicle cabin. For example, the antenna 12 can receive radio transmissions used in tire pressure monitoring systems, remote keyless entry systems and TV receivers (when capable of receiving radio transmissions), and can transmit and receive, between itself and a communication device outside the vehicle cabin, radio transmissions used in electronic toll collection (ETC) transponders (when capable of transmitting and receiving radio transmissions).

Figure 2:
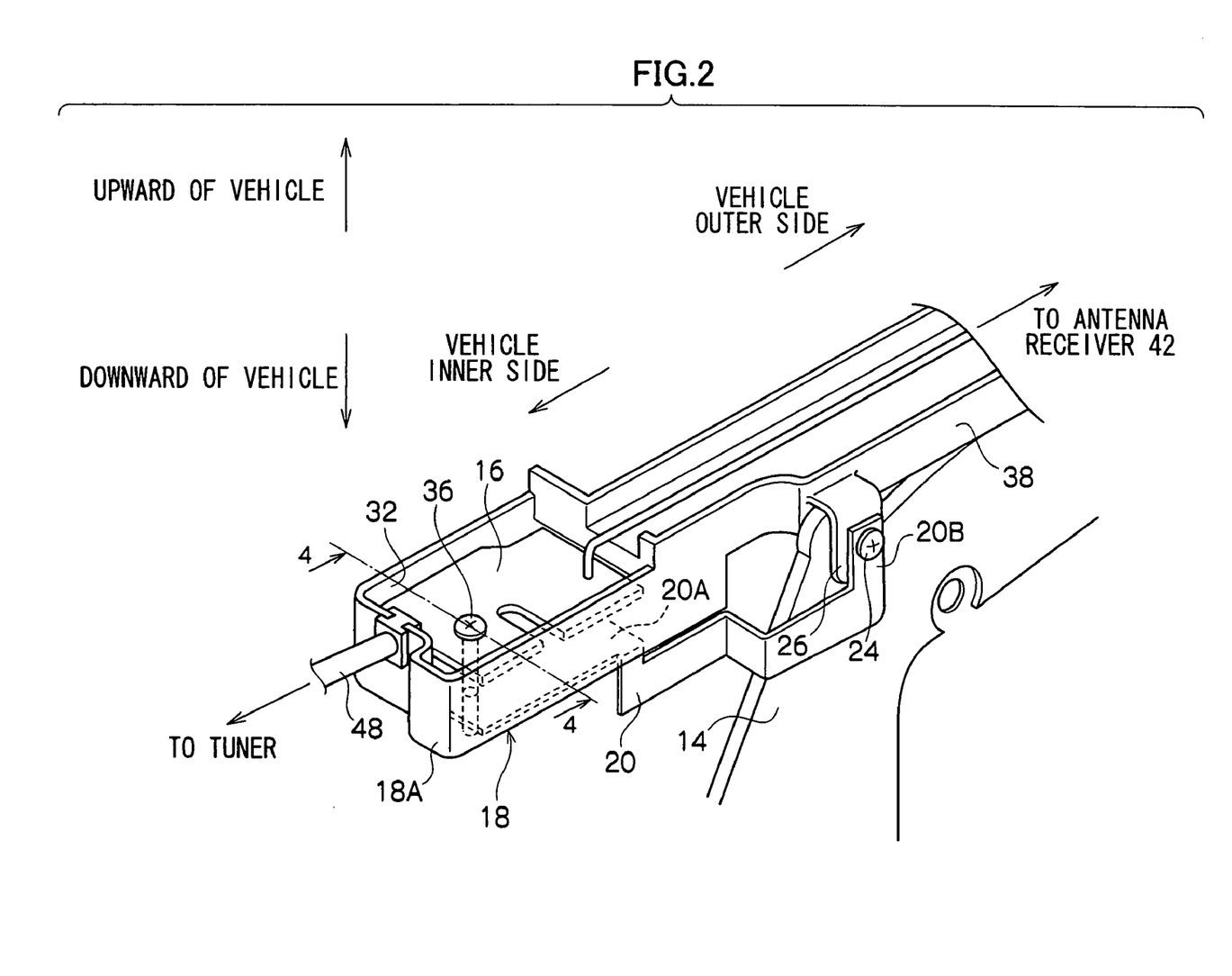
FIG. 2 is a perspective view schematically showing an antenna grounded to a frame.

The antenna 12 includes a case 18 configured by a lower case 18A and an upper case 18B. The upper case 18B is disposed in correspondence to, and tightly adhered to the upper portion of the lower case 18A. The case 18 is formed from resin, for example, and is electrically insulated. As shown in FIG. 2, a substantially rectangular box-like base plate housing 32 is disposed at the vehicle inner end portion of the case 18.

Figure 3:
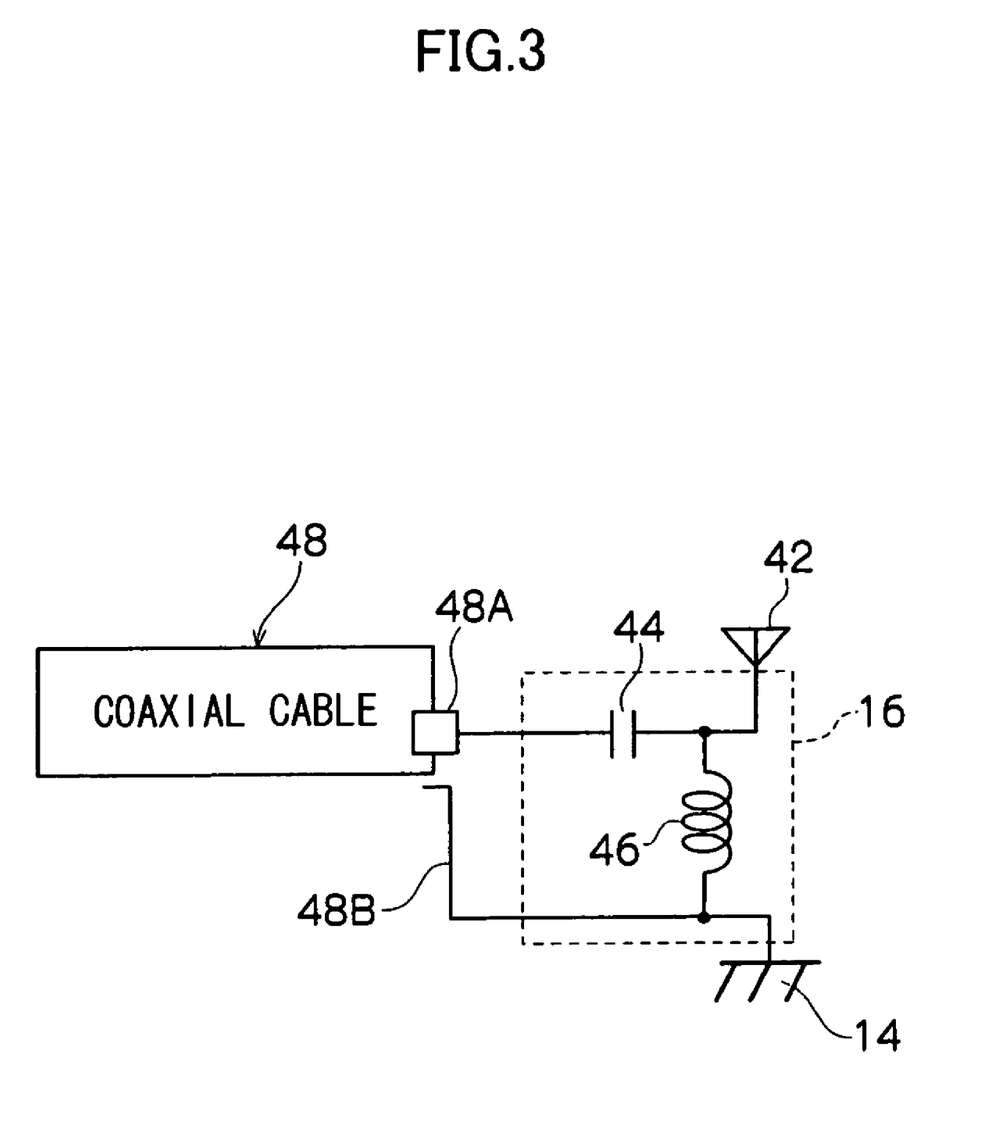
FIG. 3 is a schematic diagram showing a matching-use base plate.

A matching-use base plate 16 is housed in the base plate housing 32. In FIG. 3, an example of the circuit configuration of the matching-use base plate 16 is shown. The matching-use base plate 16 shown in FIG. 3 includes a capacitor 44. One end portion of the capacitor 44 is connected to a central conductor 48A of a coaxial cable 48 connected to an unillustrated tuner, and the other end portion of the capacitor 44 is connected to an antenna receiver 42, which is the site of the antenna 12 that receives radio transmissions.

One end portion of a coil 46 that configures the matching-use base plate 16 together with the capacitor 44 is connected between the other end portion of the capacitor 44 and the antenna receiver 42.

The other end portion of the coil 46 is connected to an external conductor 48B of the coaxial cable 48 and grounds the frame 14 as described later together with the external conductor 48B of the coaxial cable 48.

The matching-use base plate 16 adjusts the receiving efficiency of radio transmissions from the outside of the vehicle cabin (the gain when the antenna 12 is capable of receiving radio transmissions) and the transmitting efficiency of radio transmissions to the outside of the vehicle cabin (the gain when the antenna 12 is capable of transmitting radio transmissions). The matching-use base plate 16 is configured to adjust (match) the impedance of the antenna receiver 42 such that the antenna 12 can receive radio transmissions most efficiently at the frequency of radio transmissions from the outside of the vehicle cabin (when capable of receiving radio transmissions) and transmit radio transmissions most efficiently at the frequency of radio transmissions to the outside of the vehicle cabin (when capable of transmitting radio transmissions).

The matching-use base plate 16 is not limited to the circuit configuration shown in FIG. 3 and can have various circuit configurations in accordance with the extent of the impedance matching of the antenna 12. For example, rather than connecting the one end portion of the coil 46 to the other end portion of the capacitor 44, the one end portion of the coil 46 may be connected to the one end portion of the capacitor 44 (between the capacitor 44 and the coaxial cable 48). Also, for example, rather than the circuit configuration shown in FIG. 3, the disposed positions of the capacitor 44 and the coil 46 may be reversed (such that the coil 46 is intervened between the antenna receiver 42 and the central conductor 48A of the coaxial cable 48 and such that the capacitor 44 is intervened between the antenna receiver 42 and the external conductor 48B of the coaxial cable 48). Moreover, when the disposed position of the capacitor 44 is changed, the end portion of the capacitor 44 at the side of the coil 46 may be connected to the coil 46 at the side of the central conductor 48A.

As shown in FIG. 2, the matching-use base plate 16 is fixed to the bottom wall of the lower case 18A using a fixing screw 36, such that the plate thickness direction of the matching-use base plate 16 is in the vertical direction of the vehicle.

Figure 4:
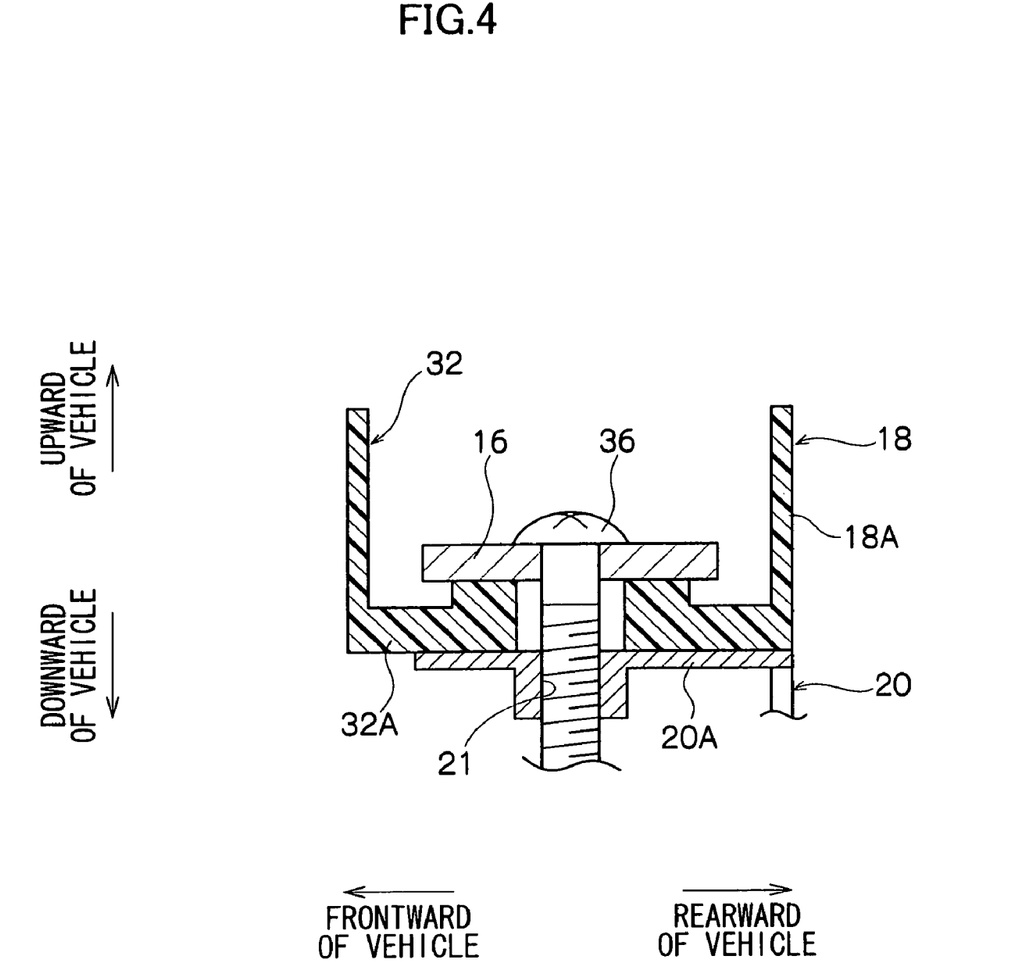
FIG. 4 is a cross-sectional view along line 4-4 of FIG. 2.

A metal plate 20 is disposed on the undersurface (downward direction of the vehicle) of the matching-use base plate 16 via a bottom wall 32A of the base plate housing 32 (see FIG. 4). A base end portion 20A of the plate 20 has a substantially tabular shape and is disposed in a state where it is exposed to the vehicle lower side of the bottom wall of the case 18A (more specifically, the bottom wall 32A of the base plate housing 32). A tap 21 is cut into the plate 20, and the fixing screw 36 is screwed into the tap 21 in a state where it has been inserted in the order of the matching-use base plate 16 and the bottom wall 32A of the base plate housing 32, whereby the plate 20 is fixed to the bottom wall 32A of the base plate housing 32 and is electrically continuous with the matching-use base plate 16 via the fixing screw 36 (more specifically, the other end portion of the coil 46 when the matching-use base plate 16 has the circuit configuration shown in FIG. 3, for example). Additionally, the plate 20 may also be made electrically continuous with the matching-use base plate 16 by disposing a nut on the base end portion 20A and screwing this onto the fixing screw 36. Also, the plate 20 may be made electrically continuous with the matching-use base plate 16 by inserting the base end portion 20A into the bottom wall 32A of the base plate housing 32 and connecting it to the undersurface of the matching-use base plate 16 with solder.

The plate 20 is disposed in order to connect the matching-use base plate 16 together with the frame 14 such that the frame 14 can be used as the ground for the antenna 12. The plate 20 extends downward from the vehicle outer side and vehicle rear side of the base end portion 20A, bends and extends outward, and includes a leading end portion 20B that is positioned at the vehicle rear side of a later-described leg portion 26.

The lower case 18A includes the leg portion 26, which corresponds to the frame 14 and the plate 20. The leg portion 26 is integrally formed on a rear wall 38 at the vehicle rear side of the lower case 18A, somewhat extends and bends rearward from a position somewhat further outward than the base plate housing 32, and protrudes downward. The interspace dimension between the leg portion 26 and the rear wall 38 corresponds to the vehicle front-rear direction dimension of the tapping screw receiving portion 14A of the frame 14, and the frame 14 (more specifically, the tapping screw receiving portion 14A, which is not shown in FIG. 2) is inserted into that interspace.

Figure 5A:
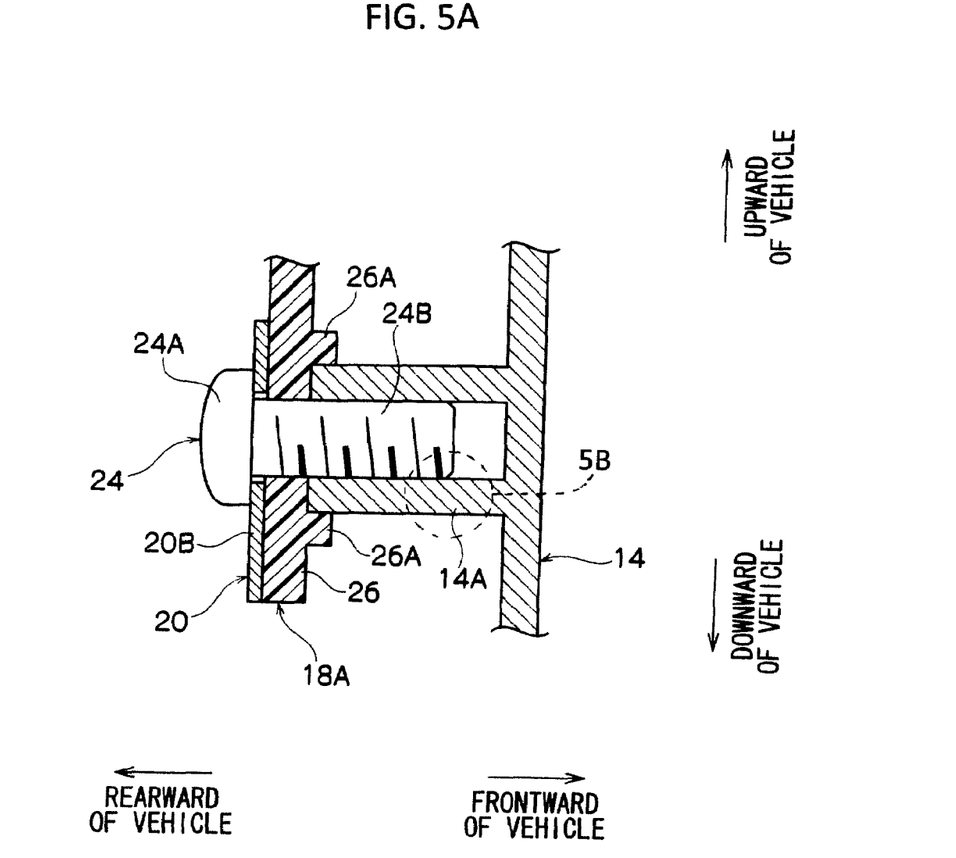
FIG. 5A is a cross-sectional view along line 5-5 of FIG. 1.

As shown in FIG. 5A (cross-sectional view along line 5-5 of FIG. 1), the leg portion 26 is fixed to the tapping screw receiving portion 14A of the frame 14 by a conductive tapping screw 24. A provisional joint portion 26A, whose diameter is larger than that of the tapping screw receiving portion 14A, is formed on the vehicle front side of the leg portion 26 in correspondence to the tapping screw receiving portion 14A. When the antenna 12 is to be attached to the frame 14, the provisional joint portion 26A is caused to engage with the tapping screw receiving portion 14A, whereby the case 18 of the antenna 12 is provisionally joined to the frame 14.

Then, a shaft portion 24B of the tapping screw 24 is screwed into the tapping screw receiving portion 14A of the frame 14 in a state where the shaft portion 24B of the tapping screw 24 has been inserted in the order of the leading end portion 20B of the plate 20 and the leg portion 26, whereby the leading end portion 20B of the plate 20 and the leg portion 26 are pushed against the tapping screw receiving portion 14A of the frame 14 by a head portion 24A of the tapping screw 24.

Figure 5B:
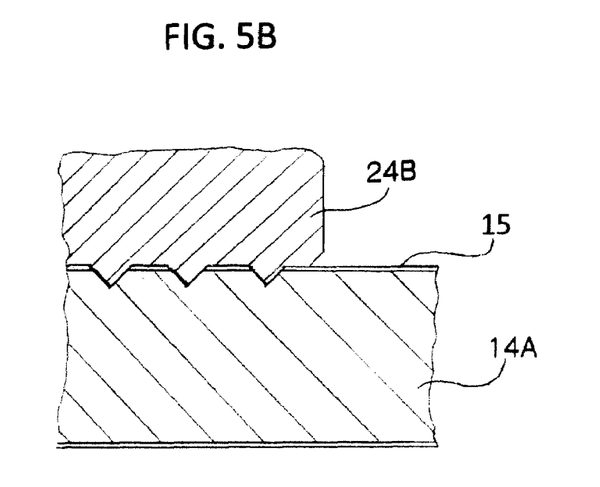
FIG. 5B is an enlargement of the area circled in phantom in FIG. 5B.

That is, the leg portion 26 is sandwiched by the leading end portion 20B of the plate 20 and the tapping screw receiving portion 14A of the frame 14. In this state, as shown in FIG. 5B, the surface treatment layer 15 of the portion of the tapping screw receiving portion 14A into which the tapping screw 24 has been screwed is stripped off by the shaft portion 24B of the tapping screw 24, and the leading end portion 20B of the plate 20 becomes electrically continuous with the tapping screw receiving portion 14A of the frame 14 via the head portion 24A and the shaft portion 24B of the tapping screw 24.

In the antenna 12 described above, a leg portion 30 corresponding to the unillustrated screw receiving portion of the frame 14 is disposed in the lower case 18A (see FIG. 1). The leg portion 30 is integrally formed on the rear wall 38 of the lower case 18A, somewhat extends and bends rearward from a position somewhat further inward from the vehicle outer end portion (more specifically, a position further outward than the leg portion 26), and protrudes downward. The interspace dimension between the leg portion 30 and the rear wall 38 corresponds to the vehicle front-rear direction dimension of the unillustrated screw receiving portion of the frame 14, and the frame 14 (more specifically, the unillustrated screw receiving portion) is inserted into that interspace. The leg portion 30 is fixed to the frame 14 as a result of a fixing screw 28 being inserted into the leg portion 30 and screwed into the screw receiving portion.

Consequently, the antenna 12 is fixed at two points to the frame 14 by the tapping screw 24 and the fixing screw 28.

As described above, in the door mirror device 10, the antenna 12 is fixed to the frame 14, and the ground of the antenna 12 is the frame 14.

Next, the action of the present embodiment will be described.

In the door mirror device 10, an antirust treatment is administered to the surface of the frame 14 for attaching parts, and the frame 14 is electrically insulated by the resulting surface treatment film 15. Also, the case 18 of the antenna 12 houses the matching-use base plate 16 and is electrically insulated. Further, the plate 20 of the antenna 12 is made of metal and disposed such that it is exposed to the outside of the lower case 18A of the case 18 in a state where the base end portion 20A is electrically continuous with the matching-use base plate 16 due to the conductive fixing screw 36.

When the antenna 12 is to be attached to the frame 14, the shaft portion 24B of the tapping screw 24 is inserted into both the leading end portion 20B of the plate 20 of the antenna 12 and the leg portion 26 of the lower case 18A of the antenna 12 in the order of the leading end portion 20B of the plate 20 of the antenna 12 and the leg portion 26 of the lower case 18A of the antenna 12, and is screwed into the tapping screw receiving portion 14A of the plate 14. The fixing screw 28 is inserted into the leg portion 30 of the lower case 18A and screwed into the unillustrated screw receiving portion of the frame 14. As a result, the leading end portion 20B of the frame 20 and the leg portion 26 of the lower case 18A are fixed to the frame 14 (more specifically, the tapping screw receiving portion 14A), and the leg portion 30 of the lower case 18A is fixed to the frame 14 (more specifically, the unillustrated screw receiving portion). In this manner, the antenna 12 is fixed at two points to the frame 14.

Here, when the tapping screw 24 is screwed into the frame 14, the surface treatment film 15 produced by the antirust treatment is stripped off by the shaft portion 24B of the tapping screw 24 at the portion of the tapping screw receiving portion 14A of the frame 14 into which the shaft portion 24B of the tapping screw 24 has been screwed. As a result, the shaft portion 24B of the tapping screw 24 becomes electrically continuous with the tapping screw receiving portion 14A of the frame 14 (see in particular FIG. 5B). Consequently, the plate 20 of the antenna 12 becomes electrically continuous with the frame 14 via the head portion 24A and the shaft portion 24B of the tapping screw 24. Thus, the ground of the antenna 12 is the frame 14.

As described above, the door mirror device 10 has a configuration where the surface treatment film 15 of the screwed portion of the tapping screw receiving portion 14A of the frame 14 is stripped off simply by screwing the tapping screw 24 into the frame 14. Thus, for example, a post-treatment for removing the surface treatment film 15 of the screwed portion of the tapping screw receiving portion 14A of the frame 14, or a treatment such as masking for laying bare just the screwed portion by masking the screwed portion of the tapping screw receiving portion 14A of the frame 14 and administering an antirust surface treatment to the other portion, becomes unnecessary, and the manufacturing cost can be kept low.

In this manner, in the door mirror device 10, the ground of the antenna 12 becomes the frame 14 for attaching parts due to the tapping screw 24. Thus, because the size and shape of the ground are fixed and a sufficient ground is obtained, a stable ground can be obtained for the antenna 12. Consequently, fluctuations in the antenna characteristics can be suppressed and the antenna gain can be improved.

Moreover, because the ground of the antenna 12 is the frame 14 for attaching parts as described above, the ground can be compacted, and therefore the antenna device itself can be compacted.

In the embodiment pertaining to the invention, as described above, the antenna 12 is fixed to the frame 14 by the tapping screw 24, and the frame 14 serves as the ground of the antenna 12. However, the fixing member is not limited to the tapping screw 24 as long as the fixing member has both the function of fixing the antenna 12 to the frame 14 as a result of the fixing member being inserted through both the leading end portion 20B of the plate 20 of the antenna 12 and the leg portion 26 of the lower case 18A of the case 18 (fixing function) and the function of causing the frame 14 to serve as the ground of the antenna 12 as a result of the fixing member becoming electrically continuous with both the plate 20 of the antenna 12 and the frame 14 (electrical continuity function). That is, it suffices for the fixing member to have a fixing function and an electrical continuity function.

The fastening member is also not limited to the tapping screw 24 as long as the fastening member has, in addition to the fixing function and the electrical continuity function that the fixing member has, the function of stripping off (or abrading) the surface treatment film 15 of the portion screwed into the frame 14 as a result of being screwed into the frame 14 (fastening function). That is, it suffices for the fastening member to have a fixing function, an electrical continuity function, and a fastening function.

As described above, in the door mirror device 10, it becomes unnecessary to dispose inside the mirror enclosure 22 a dedicated base plate to obtain a ground for the antenna 12 or to wind and lay an AV cable or the like inside the vehicle body. Thus, the assembly of the antenna 12 becomes easy, which is preferable.

Also, in the door mirror device 10, because a sufficiently large ground can be obtained even though the door mirror device 10 is compact, the size and shape of the antenna 12 can be freely set in accordance with the empty space inside the mirror enclosure 22.

Also, because the antenna 12 of the door mirror device 10 can be used as at least one of an antenna for receiving radio transmissions and an antenna for transmitting radio transmissions, the antenna 12 can be applied as a receiving antenna of radio transmissions used in tire pressure monitoring systems, remote keyless entry systems, and TV receivers (when capable of receiving radio transmissions), for example, can be applied as an antenna for transmitting and receiving radio transmissions used in ETC transponders, and can be applied as an antenna for various other purposes.

APPLIED EXAMPLE 1

Figure 6:
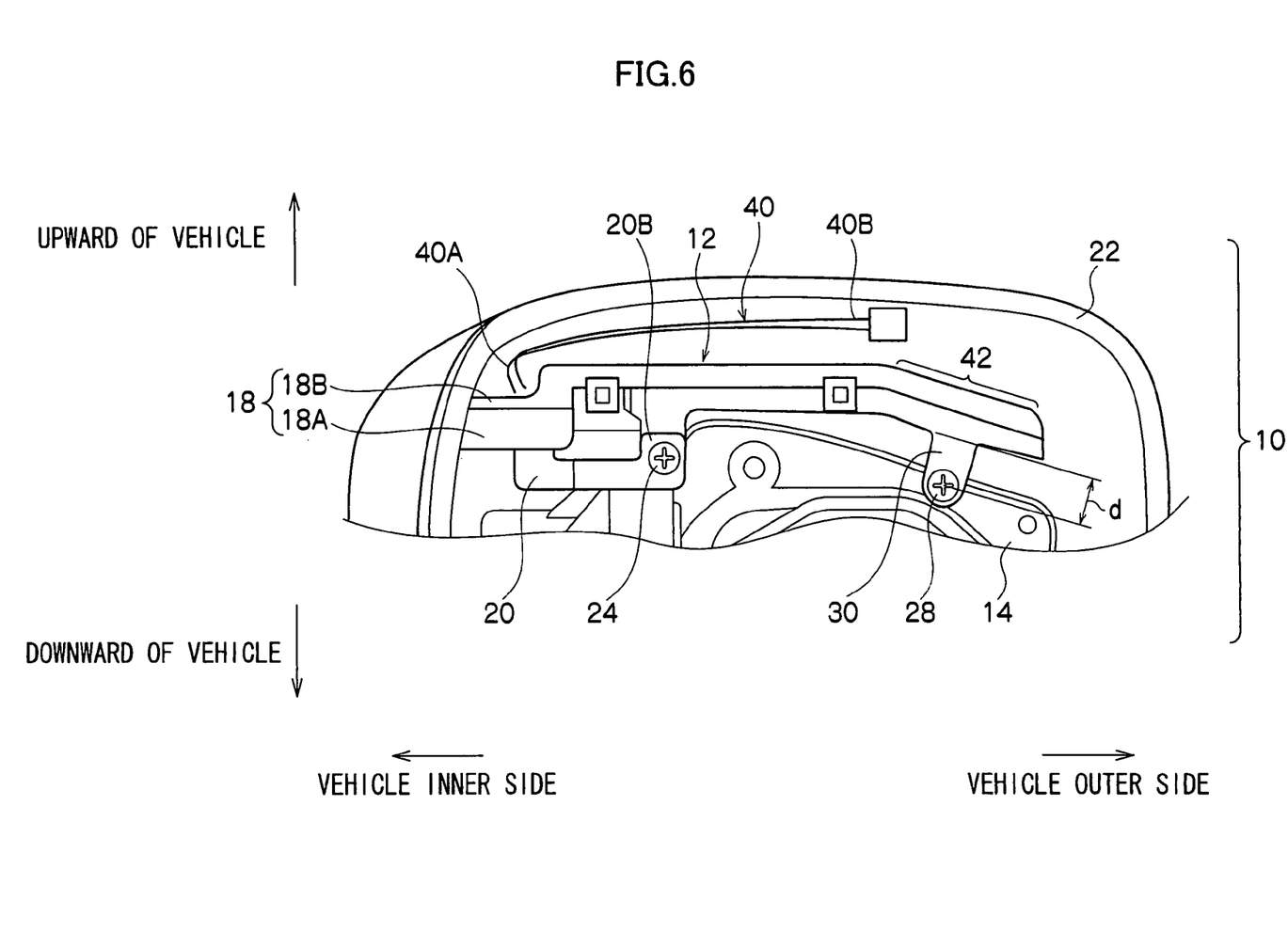
FIG. 6 is a front sectional view schematically showing an applied example of the vehicular door mirror device.

An applied example of the door mirror device 10 will described below. The present applied example is one where the antenna 12 of the door mirror device 10 is applied as a receiving antenna of radio transmissions used in tire pressure monitoring systems.

As shown in FIG. 6, an antidazzle harness 40 is disposed away from the antenna 12 inside the mirror enclosure 22 of the door mirror device 10. The antidazzle harness 40 is fixed to the inside of the mirror enclosure 22 by an unillustrated fixing member above the antenna 12. The antidazzle harness 40 includes a base end portion 40A that is disposed at the vehicle inner side inside the mirror enclosure 22 and a leading end portion 40B that is disposed at the vehicle outer side inside the mirror enclosure 22. Overall, the antidazzle harness 40 lies substantially linearly from the vehicle inner side to the vehicle outer side.

In the door mirror device 10, the antenna receiver/frame interdistance d (simply referred to below as "the distance d") between the axial position of the fixing screw 28 and the bottom wall of the vehicle outer portion of the lower case 18A of the antenna 12 (strictly speaking, the antenna receiver 42 of the antenna 12) was changed and the antenna gain was measured. In the present applied example, the distance d was set to the four values of 5 mm, 7.5 mm, 10 mm, and 12 mm, and the antenna gain was measured in each case.

Figure 7:
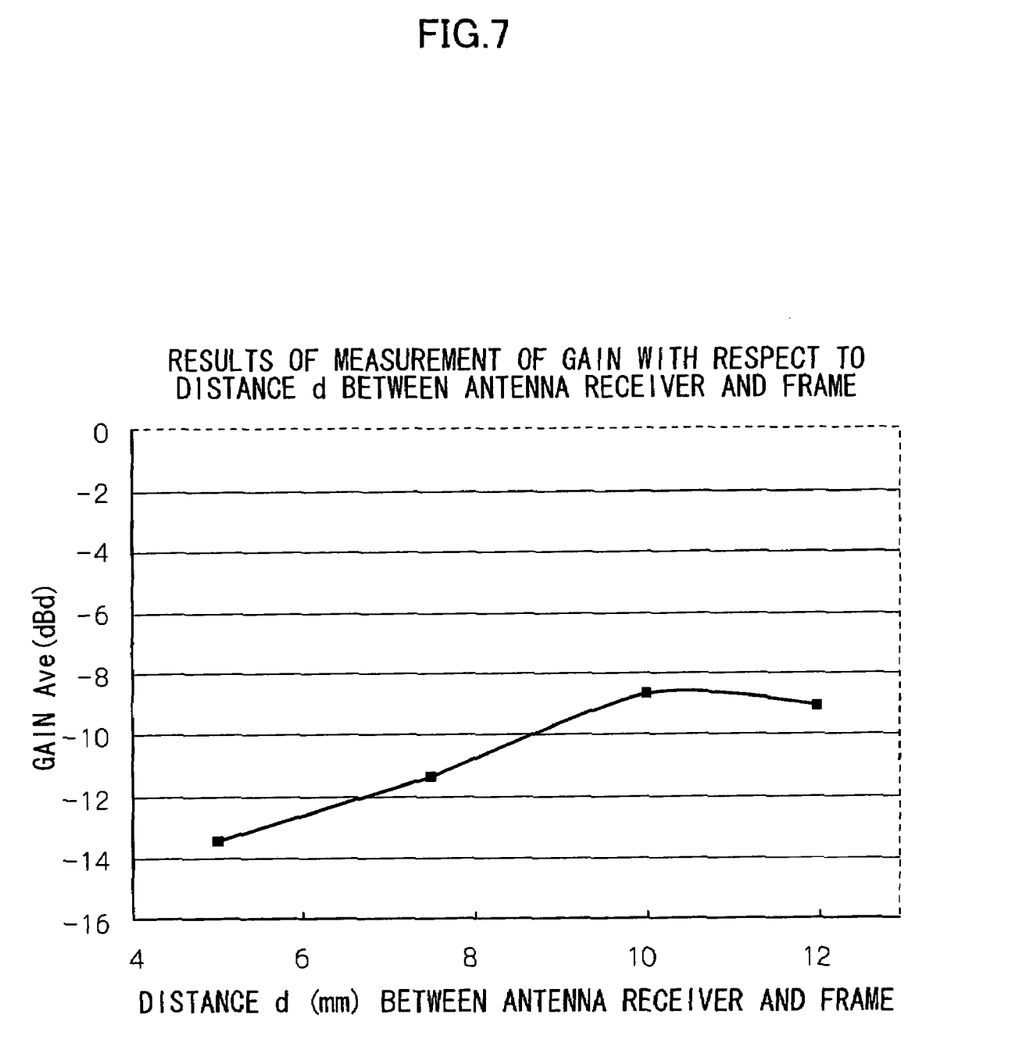
FIG. 7 is a graph showing the results of measuring antenna gains with respect to the distance between an antenna receiver and the frame.
Figure 8:
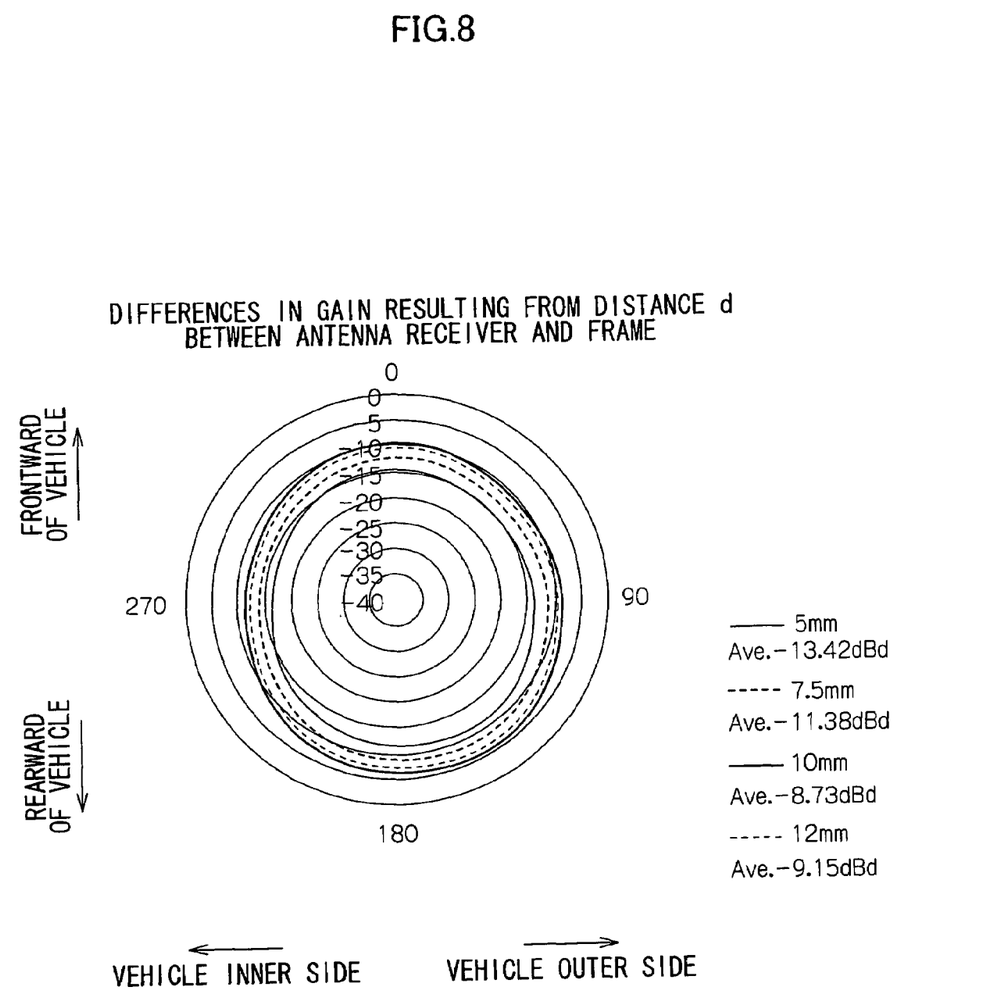
FIG. 8 is a characteristic graph of the antenna gains and corresponds to FIG. 7.

As shown in FIG. 7 and FIG. 8, when the distance d was 5 mm, the average antenna gain was −13.42 dBd. When the distance d was 7.5 mm, the antenna gain was improved because the antenna 12 was further away from the frame 14 that is a metal body in comparison to when the distance d was 5 mm, and the average antenna gain was −11.38 dBd.

When the distance d was 10 mm, the antenna gain was further improved because the antenna 12 (more specifically, the antenna receiver 42) was further away from the frame 14 in comparison to when the distance d was 7.5 mm, and the average antenna gain was −8.73 dBd. When the distance d was 12 mm, the antenna 12 (more specifically, the antenna receiver 42) was further away from the frame 14 in comparison to when the distance d was 10 mm, but the affect of bringing the antenna 12 closer to the antidazzle harness 40 became remarkable, the antenna gain dropped, and the average antenna gain was −9.15 dBd.

It will be understood from the above experimental data that it is most preferable for the distance d to be 10 mm among the four set values.

As shown in FIG. 7, from the characteristic graph (gradually curving line in FIG. 7) obtained on the basis of the data with respect to these four set values, it is most preferable for the distance d to be substantially 10 mm.

Also, as shown in FIG. 8, whichever set value of the four set values the distance d is, the characteristic graphs of the antenna gains are substantially concentric. That is, in the respective set values, about the same antenna gain is obtained regardless of the receiving direction of radio transmissions in the vehicle front-rear direction and the vehicle inner-outer direction (vehicle left-right direction). Consequently, in the door mirror device 10, the antenna 12 has virtually no directivity and can sense radio transmissions to the same extent even when it receives radio transmissions in from either of the vehicle front-rear direction and the vehicle inner-outer direction, which is preferable.

From the above measurement results, it will be understood that in the door mirror device 10, the empty space inside the mirror enclosure 22 is limited, but when the antenna 12 (more specifically, the antenna receiver 42 of the antenna 12) is disposed above the frame 14 and away from the frame 14 a predetermined distance (e.g., substantially 10 mm) inside this empty space, affects resulting from the frame 14 (e.g., radio transmissions from the outside being blocked, etc.) are reduced, which is preferable.

APPLIED EXAMPLE 2

Another applied example of the door mirror device 10 will be described below. The present applied example is one where the disposed place is changed between when the antenna 12 of the door mirror device 10 is applied as a receiving antenna of radio transmissions used in remote keyless entry systems or TV receivers and when the antenna 12 of the door mirror device 10 is applied as a receiving antenna of radio transmissions used in tire pressure monitoring systems. Here, an example will be described where the antenna shape of the antenna receiver 42 is helical.

In the present applied example, the stand 50 that supports the frame 14 and the mirror enclosure 22, the door mirror stay 34, and the vehicle body are all made of steel, and all of these are electrically connected (electrically continuous). The frame 14, the stand 50, the door mirror stay 34, and the vehicle body may also be made of a metal other than steel, and may be formed by another conductive material—in other words, they may be conductive.

Figure 9:
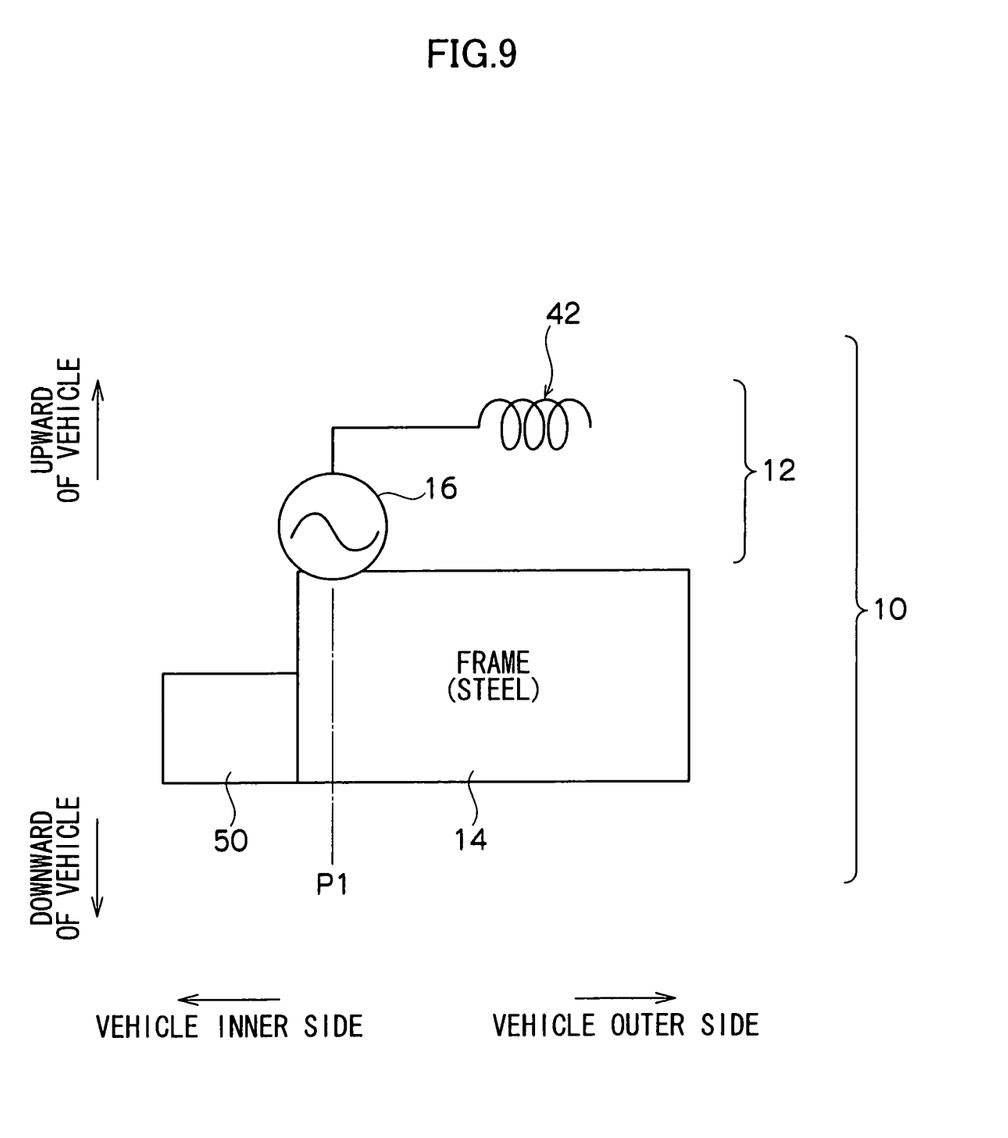
FIG. 9 is a schematic diagram showing another applied example of the vehicular door mirror device.
Figure 10:
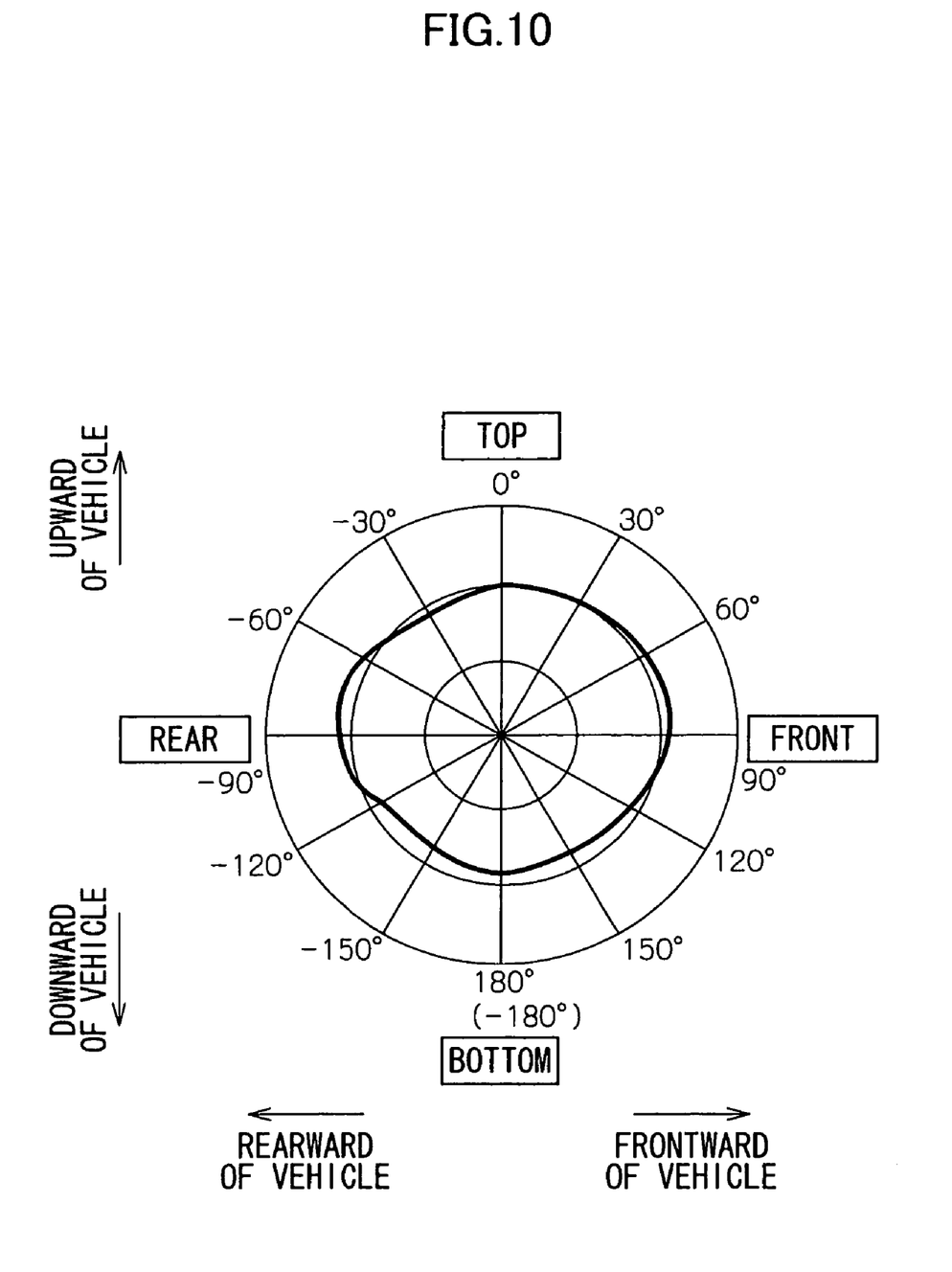
FIG. 10 is a characteristic graph of the antenna gains and corresponds to FIG.9.

When the antenna 12 is attached to the vehicle inner side of the frame 14 (ground position P1 (position of the tapping screw 24) of the antenna 12 in the vehicle inner-outer direction) as shown in FIG. 9, the characteristic graph of the antenna gains are substantially concentric as shown in FIG. 10. That is, about the same antenna gain is obtained regardless of the receiving direction of radio transmissions in the vehicle front-rear direction and the vehicle vertical direction.

In this manner, even if the antenna 12 of the door mirror device 10 has virtually no directivity and receives radio transmissions from either of the vehicle front-rear direction and the vehicle vertical direction, the antenna 12 can sense them to about the same extent.

Consequently, this is preferable when the antenna 12 is applied as a receiving antenna of radio transmissions used in remote keyless entry systems or TV receivers.

Figure 11:
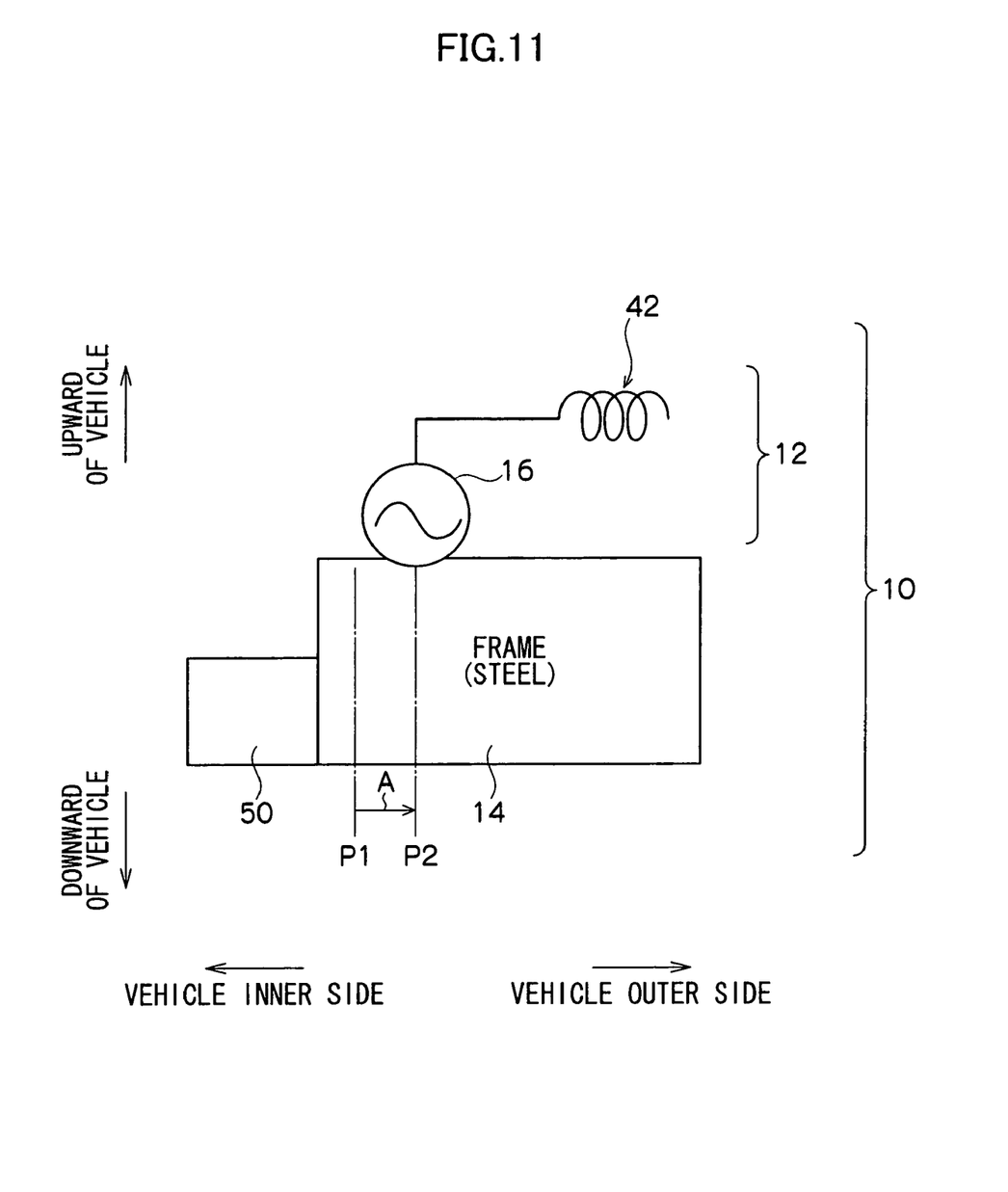
FIG. 11 is a schematic diagram showing a configuration where the position of the antenna has been changed in the other applied example of the vehicular door mirror device.
Figure 12:
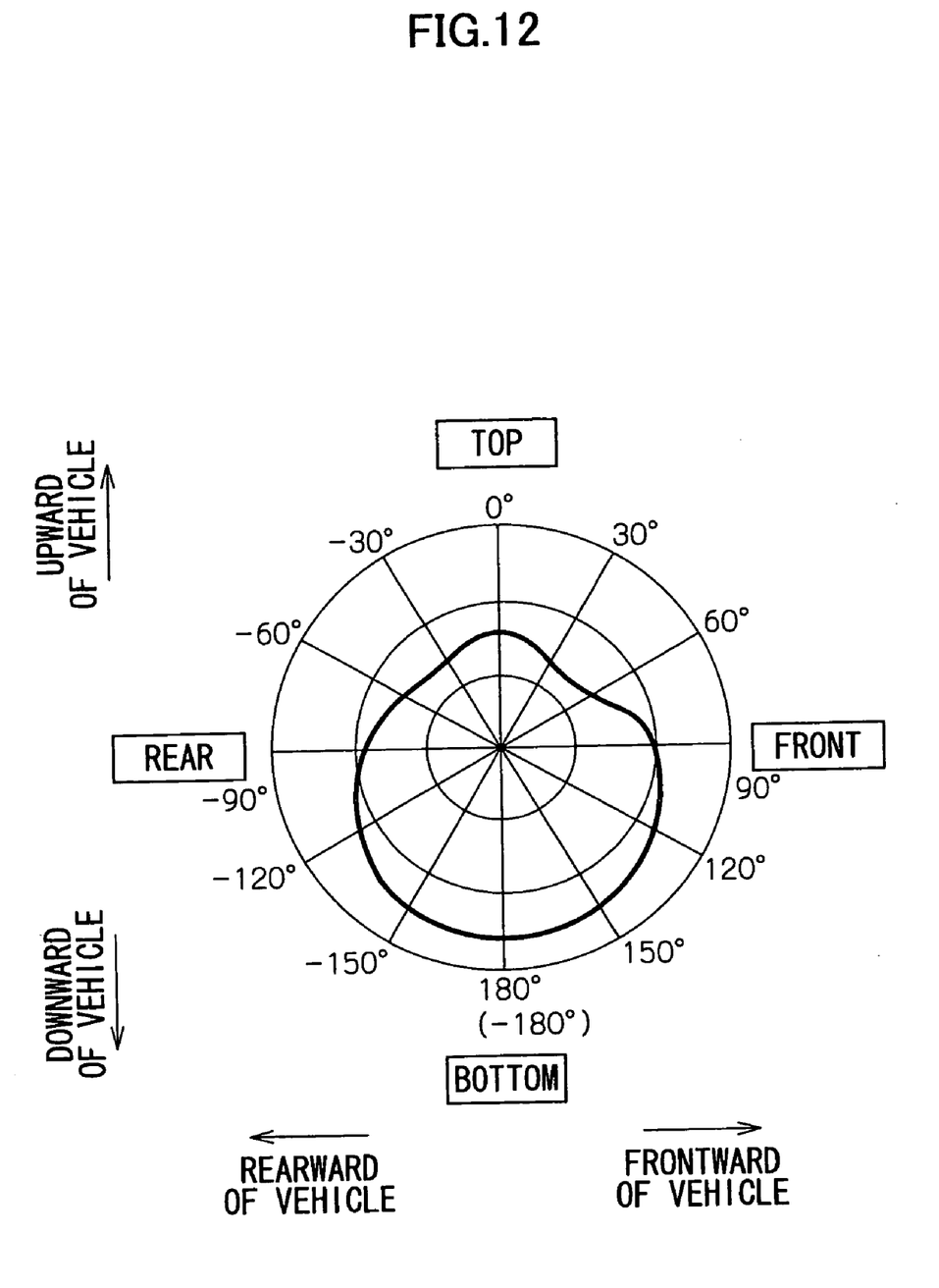
FIG. 12 is a characteristic graph of the antenna gains and corresponds to FIG. 11.

When the ground position of the antenna 12 in the vehicle inner-outer direction is placed at a ground position P2 further outward than the ground position P1 and the antenna receiver 42 of the antenna 12 is disposed in the vicinity of the position of the outer end portion of the frame 14 in the vehicle inner-outer direction (i.e., when the antenna 12 is moved to the vehicle outer side of the frame 14; see arrow A) as shown in FIG. 11, the characteristic graph of the antenna gains (horizontally polarized waves) is substantially symmetrical with respect to the center position in the vehicle front-rear direction, but the antenna gain is higher overall at the vehicle lower side than the vehicle upper side in the vehicle vertical direction.

In this manner, in the door mirror device 10, the empty space in the mirror enclosure 22 is limited, but the directivity of the antenna 12 becomes oriented downward when the antenna receiver 42 of the antenna 12 is disposed in the vicinity of the outer end portion of the frame 14 in the vehicle inner-outer direction inside the empty space. For this reason, the antenna 12 can more precisely sense radio transmissions from below than from above.

Consequently, this is preferable when the antenna 12 is applied as a receiving antenna of radio transmissions used in tire pressure monitoring systems.

A case has been described above where the antenna shape of the antenna receiver 42 was helical, but the antenna 12 can obtain a high gain in the case of this shape.

If the antenna shape of the antenna receiver 42 is linear, the antenna receiver/frame interdistance d can be lengthened and a broadband antenna can be configured.

Also, as in the case of applied example 1, the antenna 12 may be disposed above the frame in a state where the antenna receiver 42 is separated a predetermined distance (e.g., substantially 10 mm) from the frame 14, and as in the case of applied example 2, the antenna 12 may be disposed in the vicinity of the position of the outer end portion of the frame in the vehicle inner-outer direction. In this case, the door mirror device 10 has both the effects described in applied example 1 and in applied example 2, which is more effective.

Embodiments of the present invention are described above, but the present invention is not limited to the embodiments as will be clear to those skilled in the art. Namely, a vehicular door mirror device pertaining to a first aspect of the invention comprises: an antenna that is disposed inside a mirror enclosure disposed such that the mirror enclosure protrudes outward from a door of a vehicle, with the antenna being capable of at least one of receiving radio transmissions from the outside of a vehicle cabin or transmitting radio transmissions to the outside of the vehicle cabin; and a metal frame for attaching parts disposed inside the mirror enclosure, supporting the antenna with a fixing member, and serving as the ground of the antenna.

In the vehicular door mirror device pertaining to the first aspect, the ground of the antenna is the frame for attaching parts due to the fixing member. Thus, because the size and the shape of the ground are fixed and a sufficient ground is obtained, a stable ground can be obtained for the antenna. Consequently, fluctuations in the antenna characteristics can be suppressed and the antenna gain can be improved.

Moreover, because the ground of the antenna is the frame for attaching parts as described above, the ground can be compacted, and therefore the antenna device itself can be compacted.

In the vehicular door mirror device pertaining to the first aspect, the antenna may be disposed above the frame in a state where the antenna is separated a predetermined distance from the frame.

In the vehicular door mirror device pertaining to this configuration, the empty space inside the mirror enclosure is limited, but when the antenna is disposed above the frame and separated a predetermined distance (for example, about 10 mm) from the frame inside this empty space, affects resulting the frame (e.g., radio transmissions from the outside being blocked, etc.), which is preferable.

In the vehicular door mirror device pertaining to the first aspect, the antenna may be disposed in the vicinity of the position of a vehicle outer end portion of the frame in a vehicle inner-outer direction.

In the vehicular door mirror device pertaining to this configuration, the empty space inside the mirror enclosure is limited, but when the antenna is disposed in the vicinity of the position of the vehicle outer end portion of the frame in the vehicle inner-outer direction, the directivity of the antenna becomes oriented downward. For this reason, this is preferable when the antenna of the vehicular door mirror device is applied as a receiving antenna of radio transmissions used in tire pressure monitoring systems, for example.

A vehicular door mirror device pertaining to a second aspect of the invention comprises: an antenna that includes a case that is electrically insulated and houses a matching-use base plate that adjusts at least one of the receiving efficiency and the transmitting efficiency of radio transmissions and a metal plate that is electrically continuous with the matching-use base plate and is exposed to the outside of the case, with the antenna being disposed inside a mirror enclosure that is disposed such that the mirror enclosure protrudes outward from a door of a vehicle and being capable of at least one of receiving radio transmissions from the outside of a vehicle cabin or transmitting radio transmissions to the outside of the vehicle cabin; a metal frame for attaching parts that is disposed inside the mirror enclosure and is electrically insulated as a result of an antirust treatment being administered to its surface; and a fixing member that fixes the antenna to the frame as a result of the fixing member being inserted into the plate and the case and is electrically continuous with the antenna and the frame, with the frame serving as the ground of the antenna.

In the vehicular door mirror device pertaining to the second aspect, an antirust treatment is administered to the surface of the frame for attaching parts, and the frame is electrically insulated. Also, the case of the antenna houses the matching-use base plate and is electrically insulated, and the plate of the antenna is made of metal and is exposed to the outside of the case in a state where the plate is electrically continuous with the matching-use base plate.

When the antenna is to be attached to the frame, the fixing member is inserted into both the plate and the case, and the antenna is fixed to the frame.

Here, in this vehicular door mirror device, the fixing member is electrically continuous with both the antenna and the frame, and the ground of the antenna is the frame for attaching parts. Thus, because the size and the shape of the ground are fixed and a sufficient ground is obtained, a stable ground can be obtained for the antenna. Consequently, fluctuations in the antenna characteristics can be suppressed and the antenna gain can be improved.

Moreover, because the ground of the antenna is the frame for attaching parts as described above, the ground can be compacted, and therefore the antenna device itself can be compacted.

As described above, in the vehicular door mirror device pertaining to the present invention, it becomes unnecessary to dispose a dedicated base plate inside the mirror enclosure or to dispose an electrical cable such as an AV cable in the vehicle body in order to obtain a ground for the antenna. Thus, the assembly of the antenna becomes easy, which is preferable.

Also, in the vehicular door mirror device, because a sufficiently large ground can be obtained even though the ground is compact, the size and shape of the antenna can be freely set in accordance with the empty space inside the mirror enclosure.

Also, because the antenna of the door mirror device can be used as at least one of an antenna for receiving radio transmissions and an antenna for transmitting radio transmissions, the antenna can be applied as an antenna for various purposes.

As described above, the vehicular door mirror device pertaining to the present invention is compact and can suppress fluctuations in the antenna characteristics.

What is claimed is:

1. A vehicular door mirror device comprising:
   an antenna that is disposed inside a mirror enclosure disposed such that the mirror enclosure protrudes outward from a door of a vehicle, with the antenna being capable of at least one of receiving radio transmissions from the outside of a vehicle cabin or transmitting radio transmissions to the outside of the vehicle cabin; and
   a metal frame for attaching parts disposed inside the mirror enclosure, supporting the antenna with a fixing member, and serving as the ground of the antenna,
   wherein the antenna includes a matching-use base plate having a control circuit that adjusts at least one of the receiving efficiency or the transmitting efficiency of radio transmissions, and the fixing member fixes and electrically connects the antenna to the frame.

2. The vehicular door mirror device of claim 1, wherein the antenna is disposed above the frame in a state where the antenna is separated a predetermined distance from the frame.

3. The vehicular door mirror device of claim 1, wherein the antenna is elongated and disposed in a position parallel to an outer end portion of the frame in a vehicle inner-outer direction.

4. The vehicular door mirror device of claim 1, wherein the fixing member is electrically continuous with the antenna and the frame.

5. The vehicular door mirror device of claim 1, wherein the frame includes a surface on which an antirust treatment film is formed such that the frame is electrically insulated, and the fixing member strips off the treatment film when the fixing member is inserted into the frame.

6. The vehicular door mirror device of claim 1, wherein
   the antenna includes a case that houses the matching-use base plate and is electrically insulated, and a metal plate that is electrically continuous with the control circuit and is exposed to the outside of the case, and
   the fixing member fixes the antenna to the frame as a result of the fixing member being inserted into the metal plate and the case and is electrically continuous with the antenna and the frame, with the antenna being grounded to the frame.

7. The vehicular door mirror device of claim 6, wherein the case includes a through hole, the antenna further includes a second fixing member, and the second fixing member is inserted into the through hole and to make the control circuit and the plate electrically continuous.

8. A vehicular door mirror device comprising:
   an antenna that includes
      a case that is electrically insulated and houses a matching-use base plate including a control circuit that adjusts at least one of the receiving efficiency or the transmitting efficiency of radio transmissions and
      a metal plate that is electrically continuous with the matching-use base plate and is exposed to the outside of the case,
   with the antenna being disposed inside a mirror enclosure that is disposed such that the mirror enclosure protrudes outward from a door of a vehicle and being capable of at least one of receiving radio transmissions from the outside of a vehicle cabin or transmitting radio transmissions to the outside of the vehicle cabin;
   a metal frame for attaching parts that is disposed inside the mirror enclosure and is electrically insulated as a result of an antirust treatment being administered to its surface; and
   a fixing member that fixes the antenna to the frame as a result of the fixing member being inserted into the metal plate and the case and is electrically continuous with the antenna and the frame, with the frame serving as the ground of the antenna.

9. A vehicular door mirror device comprising:
   a mirror enclosure disposed such that it protrudes outward from a door of a vehicle;
   an antenna that is disposed inside the mirror enclosure and is capable of at least one of receiving or transmitting radio transmissions;
   a metal frame for attaching parts that is disposed inside the mirror enclosure and grounds the antenna; and
   a fixing member that supports the antenna on the frame and electrically connects the antenna to the frame,
   wherein the antenna includes a matching-use base plate including a control circuit that adjusts at least one of the receiving efficiency or the transmitting efficiency of radio transmissions and a receiving portion that is elongated along a linear axis and disposed in a position substantially parallel to an outer end portion of the frame and spaced apart from said outer end portion of the frame.

10. The vehicular door mirror device of claim 9, wherein the antenna is capable of at least one of receiving radio transmissions from the outside of a vehicle cabin or transmitting radio transmissions to the outside of the vehicle cabin.

11. The vehicular door mirror device of claim 9, wherein the antenna is disposed above the frame in a state where the antenna receiving portion is separated a predetermined distance from an outer edge of the frame of between about 6 and 12 mm.

12. The vehicular door mirror device of claim 9, wherein the fixing member is electrically continuous with the antenna and the frame.

13. The vehicular door mirror device of claim 9, wherein the frame includes a surface on which an antirust treatment film is formed such that the frame is electrically insulated, and the fixing member strips off the treatment film when the fixing member is inserted into the frame.

14. The vehicular door mirror device of claim 9, wherein
the antenna includes a case that houses the matching-use base plate and is electrically insulated, and a metal plate that is electrically continuous with the control circuit and is exposed to the outside of the case, and
the fixing member fixes the antenna to the frame as a result of being inserted into the metal plate and the case and is electrically continuous with the antenna and the frame, with the antenna being grounded to the frame.

15. The vehicular door mirror device of claim 14, wherein the case includes a through hole, the antenna further includes a second fixing member, and the second fixing member is inserted into the through hole to make the control circuit and the plate electrically continuous.

* * * * *